US012669320B2

(12) United States Patent
Tekieli et al.

(10) Patent No.: US 12,669,320 B2
(45) Date of Patent: Jun. 30, 2026

(54) REDUNDANT INDUCTIVE SENSOR SYSTEM AND METHODS

(71) Applicant: Allegro MicroSystems, LLC, Manchester, NH (US)

(72) Inventors: Philippe Tekieli, Ecully (FR); Solène Bastien, Naves-Parmelan (FR)

(73) Assignee: Allegro MicroSystems, LLC, Manchester, NH (US)

( * ) Notice: Subject to any disclaimer, the term of this patent is extended or adjusted under 35 U.S.C. 154(b) by 182 days.

(21) Appl. No.: 18/804,223

(22) Filed: Aug. 14, 2024

(65) Prior Publication Data

US 2026/0049808 A1 Feb. 19, 2026

(51) Int. Cl.
G01B 7/00 (2006.01)
G01V 3/10 (2006.01)

(52) U.S. Cl.
CPC ............. G01B 7/003 (2013.01); G01V 3/105 (2013.01)

(58) Field of Classification Search
CPC ........ G01B 7/003; G01V 3/105; G01V 3/108; G01V 3/104; G01V 3/10; H01F 7/06; H01F 7/02; H01F 1/00; H01F 7/064
See application file for complete search history.

(56) References Cited

U.S. PATENT DOCUMENTS 5,471,122 A 11/1995 Bilotti et al.
6,288,567 B1 9/2001 Fink 6,542,847 B1 4/2003 Lohberg et al.
6,687,644 B1 2/2004 Zinke et al.
6,968,484 B2 11/2005 Hummel
7,091,876 B2 8/2006 Streger
7,184,876 B2 2/2007 Teulings et al.
7,319,418 B2 1/2008 Fink
7,466,123 B2 12/2008 Kato et al.
8,122,159 B2 2/2012 Monreal
8,183,982 B2 5/2012 Scherr
(Continued)

FOREIGN PATENT DOCUMENTS

WO WO 9808711 3/1998

OTHER PUBLICATIONS

U.S. Appl. No. 18/337,562, filed Jun. 20, 2023, Dono, et al.
(Continued)

*Primary Examiner* — Alvaro E Fortich
(74) *Attorney, Agent, or Firm* — DALY, CROWLEY, MOFFORD & DURKEE, LLP

(57) ABSTRACT

A redundant inductive sensor system includes at least two interface circuits, each associated with a respective transmitting coil that is electromagnetically coupled to one or more receiving coils. The first interface circuit transmits during a first transmitting interval and the second interface circuit transmits during a second transmitting interval that does not overlap with the first transmitting interval. The first interface circuit receives the second signal during a first listening interval of the first interface circuit encompassing the second transmitting interval and the second interface circuit receives the first signal during a second listening interval of the second interface circuit encompassing the first transmitting interval. By listening to transmissions from transmitting coils other than an associated transmitting coil, interface circuits can detect errors in other interface circuits.

18 Claims, 7 Drawing Sheets

(56) References Cited

U.S. PATENT DOCUMENTS

| | | | |
|---|---|---|---|
| 8,519,819 B2 | 8/2013 | Scherr | |
| 8,577,634 B2 | 11/2013 | Donovan et al. | |
| 8,624,588 B2 | 1/2014 | Vig et al. | |
| 8,922,331 B2 | 12/2014 | Scherr | |
| 8,994,369 B2 | 3/2015 | Vig et al. | |
| 9,552,315 B2 | 1/2017 | Monreal | |
| 9,739,846 B2 | 8/2017 | Petrie et al. | |
| 10,074,939 B1 * | 9/2018 | Briano | H01R 13/658 |
| 10,495,485 B2 | 12/2019 | Burdette et al. | |
| 10,495,700 B2 | 12/2019 | Prentice et al. | |
| 10,725,122 B2 | 7/2020 | Rubinsztain et al. | |
| 10,782,366 B2 | 9/2020 | Stewart | |
| 10,908,230 B2 | 2/2021 | Rubinsztain et al. | |
| 11,368,533 B2 | 6/2022 | Kozomora et al. | |
| 11,811,569 B2 | 11/2023 | Ferrer et al. | |
| 11,894,844 B1 | 2/2024 | Hein | |
| 11,967,650 B2 | 4/2024 | Saxena et al. | |
| 12,107,710 B2 | 10/2024 | Casu et al. | |
| 2019/0265018 A1 * | 8/2019 | Latham | G01R 33/0017 |
| 2020/0256907 A1 * | 8/2020 | Gaggero | G01D 5/2006 |
| 2021/0247213 A1 | 8/2021 | Metivier et al. | |
| 2021/0341312 A1 * | 11/2021 | Lange | G01B 7/003 |
| 2022/0155106 A1 * | 5/2022 | Casu | G01P 3/488 |
| 2023/0332965 A1 | 10/2023 | Casu et al. | |
| 2023/0378977 A1 | 11/2023 | Bastien et al. | |
| 2023/0400477 A1 | 12/2023 | Friedrich et al. | |

OTHER PUBLICATIONS

U.S. Appl. No. 18/354,895, filed Jul. 19, 2023, Richards, et al.
U.S. Appl. No. 18/354,903, filed Jul. 19, 2023, Lassalle-Balier, et al.
U.S. Appl. No. 18/788,327, filed Jul. 30, 2024, Richards.

* cited by examiner

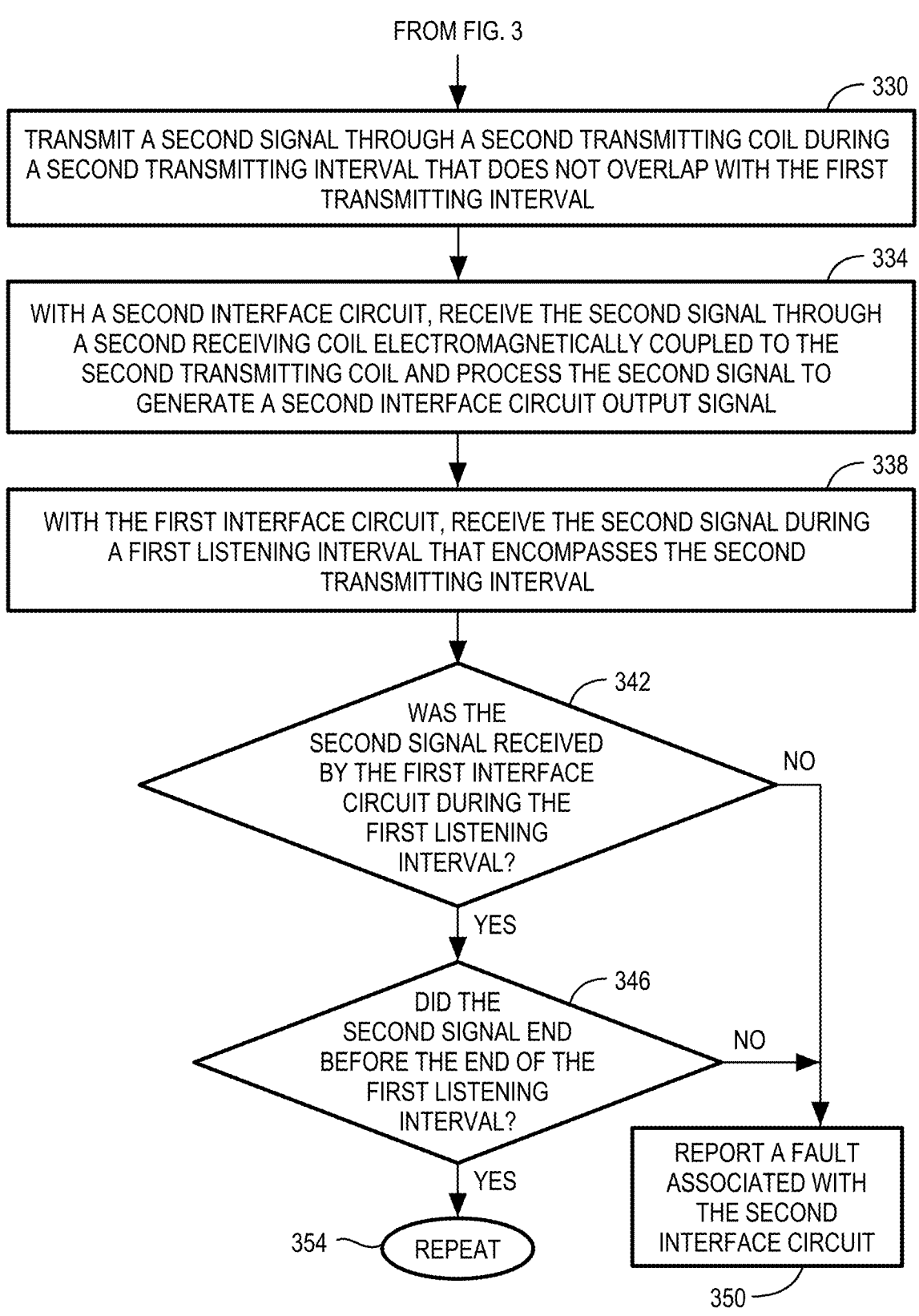

FROM FIG. 3

330

TRANSMIT A SECOND SIGNAL THROUGH A SECOND TRANSMITTING COIL DURING A SECOND TRANSMITTING INTERVAL THAT DOES NOT OVERLAP WITH THE FIRST TRANSMITTING INTERVAL

334

WITH A SECOND INTERFACE CIRCUIT, RECEIVE THE SECOND SIGNAL THROUGH A SECOND RECEIVING COIL ELECTROMAGNETICALLY COUPLED TO THE SECOND TRANSMITTING COIL AND PROCESS THE SECOND SIGNAL TO GENERATE A SECOND INTERFACE CIRCUIT OUTPUT SIGNAL

338

WITH THE FIRST INTERFACE CIRCUIT, RECEIVE THE SECOND SIGNAL DURING A FIRST LISTENING INTERVAL THAT ENCOMPASSES THE SECOND TRANSMITTING INTERVAL

342

WAS THE SECOND SIGNAL RECEIVED BY THE FIRST INTERFACE CIRCUIT DURING THE FIRST LISTENING INTERVAL?

NO

YES

346

DID THE SECOND SIGNAL END BEFORE THE END OF THE FIRST LISTENING INTERVAL?

NO

YES

354    REPEAT

REPORT A FAULT ASSOCIATED WITH THE SECOND INTERFACE CIRCUIT

REDUNDANT INDUCTIVE SENSOR SYSTEM AND METHODS

BACKGROUND

As is known, inductive position sensors generally include a primary, or transmitting coil that generates a biasing field in response to an oscillation signal and one or more secondary, or receiving coils electromagnetically coupled to the transmitting coil for generating one or more secondary signals. The secondary signal can be processed to detect a position of a target arranged such that the coupling between the transmitting and receiving coils is a function of the target position. For example, the target can be a ferrous core around which the transmitting and receiving coils are wound. In general, the target position information is amplitude modulated in the secondary signal that can be demodulated synchronously with respect to the primary oscillation in order to extract target position information. In one example configuration, two receiving coils are arranged to generate respective receive signals that contain amplitude modulated sine and cosine information that can be processed to determine target angle.

Inductive position sensors are used in a wide variety of applications including automotive and industrial applications and other safety critical applications. There are a variety of specifications that set forth requirements related to permissible sensor quality levels, failure rates, and overall functional safety. One approach to meeting such mandates has been to use redundant circuitry.

SUMMARY

The present disclosure is directed to an inductive sensor system with redundant interface circuits configured for communication in a manner that provides fail operational redundancy without requiring complex coil structures to decouple multiple coil systems, which complex coil structures can degrade signal levels, accuracy and increase PCB size. Interface circuits transmit data one at a time and listen to transmissions from other interface circuits in order to thereby detect errors in the other interface circuits.

According to the disclosure, an inductive sensor system includes a first interface circuit adapted to be coupled to a first transmitting coil to transmit a first signal through the first transmitting coil during a first transmitting interval of the first interface circuit and adapted to be coupled to a first receiving coil that is electromagnetically coupled to the first transmitting coil and configured to receive the first signal during the first transmitting interval and generate an output signal of the first interface circuit based on the first signal. The inductive sensor system further includes a second interface circuit adapted to be coupled to a second transmitting coil to transmit a second signal through the second transmitting coil during a second transmitting interval of the second interface circuit that does not overlap with the first transmitting interval and adapted to be coupled to a second receiving coil that is electromagnetically coupled to the second transmitting coil and configured to receive the second signal during the second transmitting interval and generate an output signal of the second interface circuit based on the second signal. The first interface circuit is configured to receive the second signal during a first listening interval of the first interface circuit encompassing the second transmitting interval and the second interface circuit is configured to receive the first signal during a second listening interval of the second interface circuit encompassing the first transmitting interval.

Features may include one or more of the following individually or in combination with other features. The first interface circuit may be configured to detect a fault associated with the second interface circuit if the second signal is not received during the first listening interval. The first interface circuit may be configured to detect a fault associated with the second interface circuit if the second signal is still being received at the end of the first listening interval. The inductive sensor system may further include a substrate supporting the first transmitting coil, the first receiving coil, the second transmitting coil, and the second receiving coil. The substrate may be a printed circuit board. The first interface circuit may be provided as a first integrated circuit and the second interface circuit may be provided as a second integrated circuit. The inductive sensor system may further include a third interface circuit adapted to be coupled to a third transmitting coil to transmit a third signal through the third transmitting coil during a third transmitting interval that does not overlap with the first transmitting interval or with the second transmitting interval and adapted to be coupled to a third receiving coil that is electromagnetically coupled to the third transmitting coil and configured to receive the third signal during the third transmitting interval and generate an output signal of the third interface circuit based on the third signal, wherein, during the first listening interval of the first interface circuit, both the first interface circuit and the third interface circuit are configured to receive the second signal. The first signal can include an identifier of the first interface circuit, the second signal can include an identifier of the second interface circuit, and the third signal can include an identifier of the third interface circuit. The identifier of the first interface circuit can be encoded in the first signal at an identifier frequency that is less than a frequency of the first signal and greater than a maximum bandwidth associated with a position of a target to be detected by the inductive sensor system, the identifier of the second interface circuit can be encoded in the second signal at the identifier frequency, and the identifier of the third interface circuit can be encoded in the third signal at the identifier frequency.

Also described is a method including transmitting a first signal through a first transmitting coil during a first transmitting interval, with a first interface circuit, receiving the first signal through a first receiving coil electromagnetically coupled to the first transmitting coil and processing the first signal to generate a first interface circuit output signal, transmitting a second signal through a second transmitting coil during a second transmitting interval that does not overlap with the first transmitting interval, with a second interface circuit, receiving the second signal through a second receiving coil electromagnetically coupled to the second transmitting coil and processing the second signal to generate a second interface circuit output signal, with the first interface circuit, receiving the second signal during a first listening interval of the first interface circuit encompassing the second transmitting interval, and with the second interface circuit, receiving the first signal during a second listening interval of the second interface circuit encompassing the first transmitting interval.

Features may include one or more of the following individually or in combination with other features. The method may further include detecting, by the first interface circuit, a fault associated with the second interface circuit if the second signal is not received during the first listening interval. The method may further include detecting, by the first interface circuit, a fault associated with the second interface circuit if the second signal is still being received at the end of the first listening interval. The method may further include fabricating the first transmitting coil, the first receiving coil, the second transmitting coil, and the second receiving coil on a common substrate. The common substrate may include a printed circuit board. The method may further include fabricating the first interface circuit as a first integrated circuit and the second interface circuit as a second integrated circuit. The method may further include transmitting a third signal through a third transmitting coil during a third transmitting interval that does not overlap with the first transmitting interval or with the second transmitting interval, with a third interface circuit adapted to be coupled to a third receiving coil that is electromagnetically coupled to the third transmitting coil, receiving the third signal during the third transmitting interval and processing the third signal to generate a third interface circuit output signal based on the third signal, and during the first listening interval of the first interface circuit, receiving the second signal with both the first interface circuit and the third interface circuit. The method may further include transmitting the first signal comprises transmitting an identifier of the first interface circuit, transmitting the second signal comprises transmitting an identifier of the second interface circuit, and transmitting the third signal comprises transmitting an identifier of the third interface circuit. The method may further include transmitting the identifier of the first circuit comprises encoding the identifier in the first signal at an identifier frequency that is less than a frequency of the first signal and greater than a maximum bandwidth associated with a position of a target to be detected, transmitting the identifier of the second circuit comprises encoding the identifier in the second signal at the identifier frequency, and transmitting the identifier of the third circuit comprises encoding the identifier in the third signal at the identifier frequency.

BRIEF DESCRIPTION OF DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

FIGS. 3 and 3A are a flow diagram illustrating operation of a redundant inductive sensor system including multiple transmitting and receiving coils and associated interface circuits, according to the disclosure;

DETAILED DESCRIPTION

Figure 1:
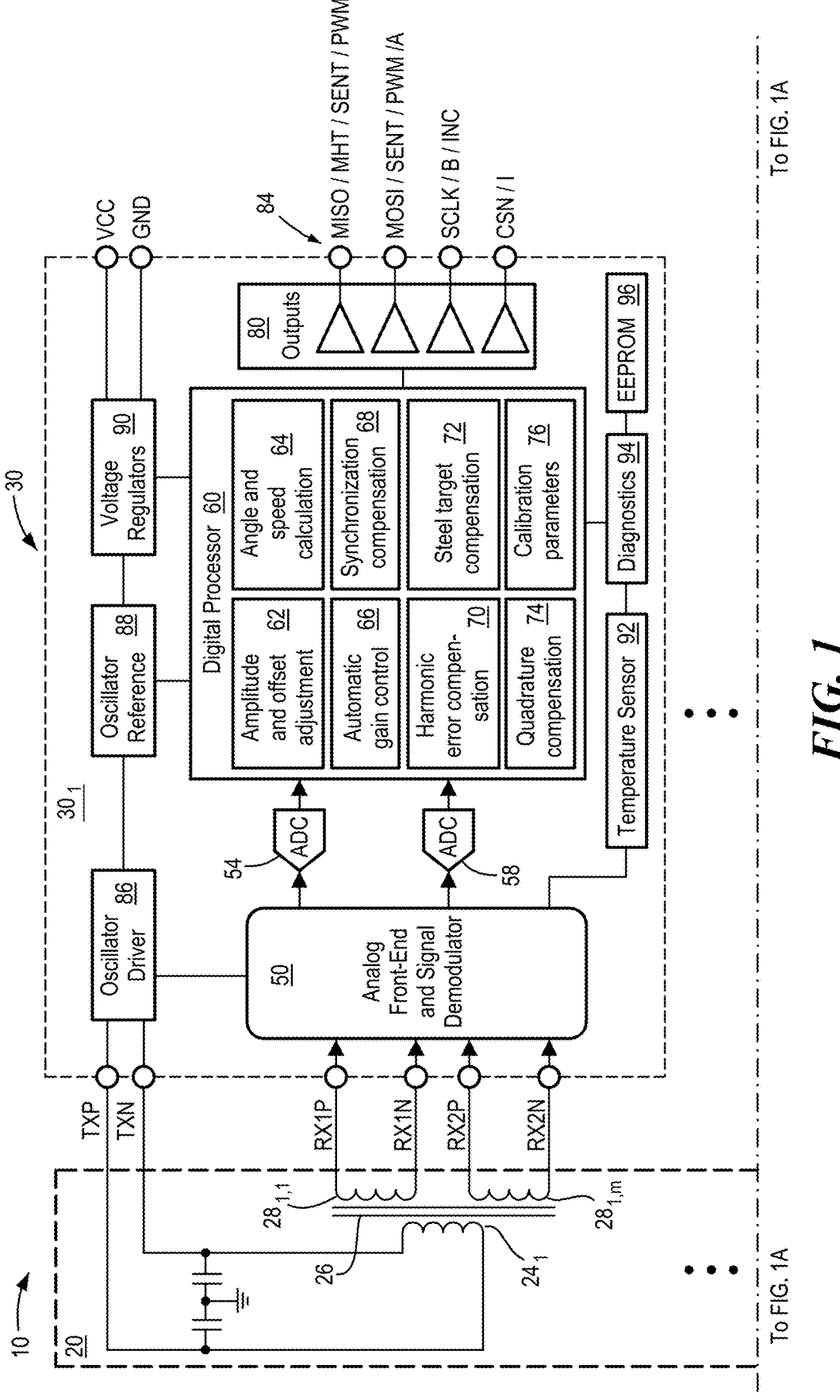
FIGS. 1 and 1A are a block diagram of a redundant inductive sensor system including multiple transmitting and receiving coils and associated interface circuits, according to the disclosure.
Figure 1A:
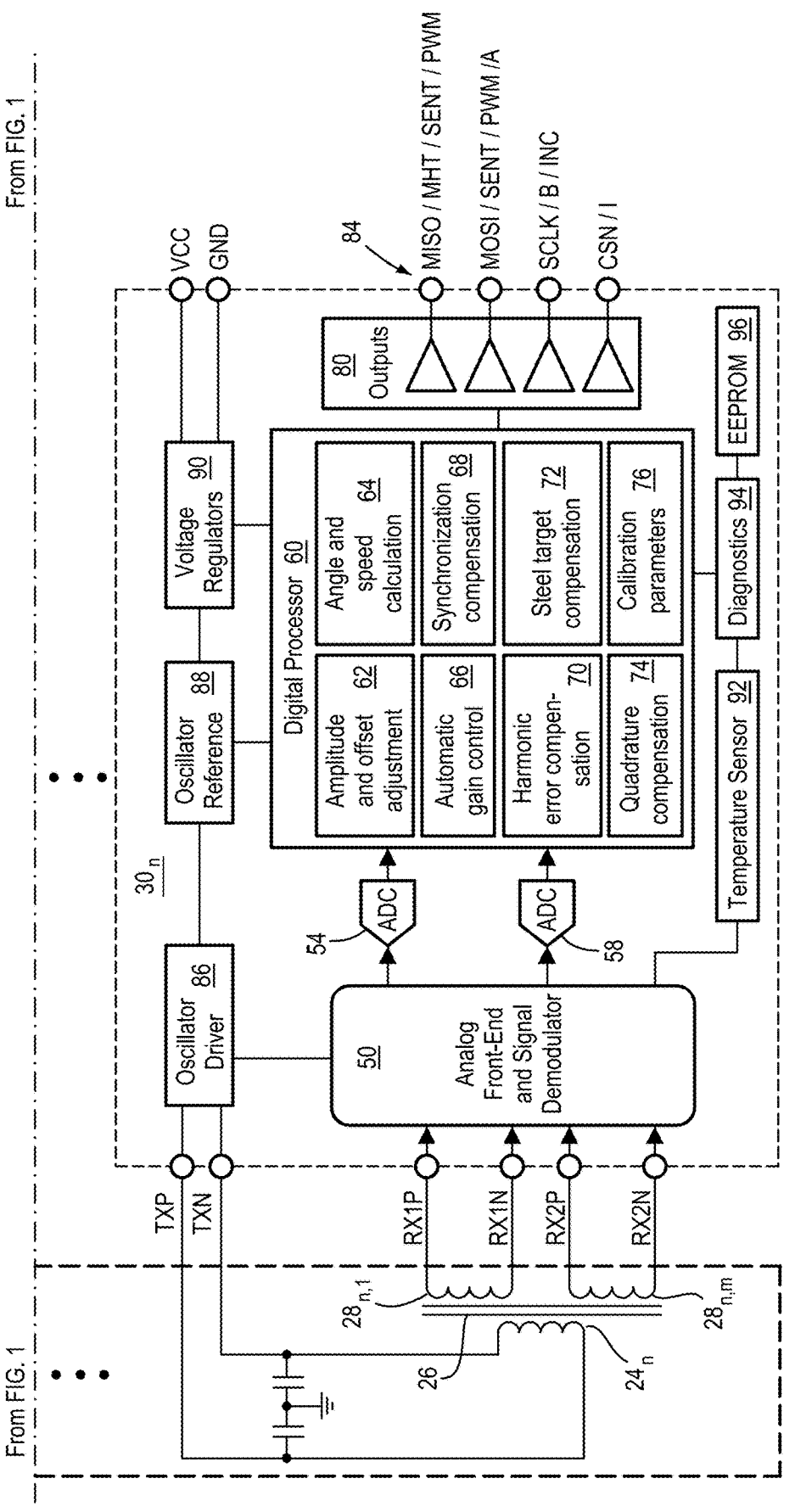

Referring to FIGS. 1 and 1A, a redundant inductive sensor system 10 includes transmitting and receiving coils 20 (including a plurality of transmitting coils $24_1$-$24_n$ and a plurality of receiving coils $28_{1,1}$-$28_{n,m}$) and associated interface circuits, or sensors 30.

Each transmitting coil $24_1$-$24_n$ is associated with one or more receiving coils $28_{1,1}$-$28_{n,m}$ in the sense that the transmitting coil is electromagnetically coupled to the one or more receiving coils as a function of a position of a rotating metallic target 26 for generating one or more secondary signals. It will be appreciated that various mechanical configurations for the target 26 and transmitting and receiving coils 20 are possible.

In the illustrated embodiment, each transmitting coil $24_1$-$24_n$ has two associated receiving coils (e.g., transmitting coil $24_1$ has associated receiving coils $28_{1,1}$ and $28_{1,m}$ and transmitting coil $24_n$ has associated receiving coils $28_{n,1}$-$28_{n,m}$). Each set of receiving coils associated with the same transmitting coil are arranged to have a predetermined phase relationship with respect to each other in order to suit a particular application. In one example configuration, receiving coils $28_{1,1}$ and $28_{1,m}$ generate respective signals in quadrature with each other that contain amplitude modulated sine and cosine information that can be processed to determine target speed, direction, and/or angle. It will be appreciated by those of ordinary skill in the art that the disclosure is not limited to any particular number of receiving coils associated with each transmitting coil.

Each transmitting coil $24_1$-$24_n$ is associated with a respective interface circuit $30_1$-$30_n$, as shown. Interface circuits $30_1$-$30_n$ can take various forms and can include various features, as described below in connection with example interface circuit $30_1$. In general, in position sensing applications, interface circuits $30_1$-$30_n$ are configured to sample signals received from the receiving coils $28_{1,1}$-$28_{n,m}$, convert the received signals into digital signals, and demodulate the digital signals in order to generate an output signal indicative of the position of the target 26.

By a "redundant" inductive sensor system, it means that system 10 includes two or more independent inductive sensor interface circuits, or sensors $30_1$-$30_n$. Interface circuits $30_1$-$30_n$ can be provided in the form of Integrated Circuits (ICs) including one or more semiconductor die in the same or in separate IC packages.

Interface circuits $30_1$-$30_n$ can be coupled to external circuits and systems for communication and control of the redundant sensor system 10. For example, in automotive applications, an external engine control unit (ECU) or other type of system processor can be coupled to receive output signals from the interface circuits $30_1$-$30_n$ and can be configured to ed control operation of the interface circuits.

In general, each interface circuit $30_1$-$30_n$ is configured for communication with external circuits and systems in a manner that provides "fail operational redundancy" without requiring complex coil structures to decouple multiple coil systems. A coil set or system refers to a transmitting coil and its associated one or more receiving coils. By "fail operational redundancy" it means that if one interface circuit (e.g., circuit $30_1$) fails, then the other interface circuit or circuits (e.g., circuit $30_n$) are not affected in their ability to operate accurately and to correctly report the failure of the failed interface circuit. This type of operation is in contrast to "fail safe redundancy", in which a failure in one interface circuit affects operation of the other interface circuits (e.g., even if another interface circuit is still generally operational, its accuracy can be affected).

Transmitting coils $24_1$-$24_n$ can be provided on a common substrate, such as a printed circuit board (PCB), and coils associated with different interface circuits can be located in the same area. With standard PCB thickness for copper and insulator layers and without decoupling coil structures, each coil system is cross coupled to the other coil systems. If more than one interface circuit $30_1$-$30_n$ were to transmit a signal at the same time, the magnetic field in the transmitting coils tends to link with receiving coils other than the associated receiving coil(s). If a failure occurs in one of the transmitting coils, then the current flowing in the other transmitting coils will be affected.

The described communication methodology includes each interface circuit transmitting at a different time (i.e., during a different transmitting interval) than any other interface circuit (e.g., non-overlapping transmitting intervals) and also includes a listening mode in which interface circuits $30_1$-$30_n$ listen to transmitting coils other than the transmitting coil associated with the respective interface circuit. For example, interface circuit $30_1$ that has an associated transmitting coil $24_1$ listens to transmissions by transmitting coils $24_2$-$24_n$ (in addition to listening to its associated transmitting coil $24_1$). In this way, each interface circuit $30_1$-$30_n$ can detect errors or failures in other interface circuits.

It will be appreciated by those of ordinary skill in the art that the interface circuits $30_1$-$30_n$ can be identical to each other or can be different, depending on the level and type of redundancy. Example interface circuit features are described in connection with example interface circuit $30_1$ that is suitable for various applications, such as industrial and automotive applications. Interface circuit $30_1$ can be used as a position sensor interface in transmission actuators, traction motors, EPS electrical motors, and other high-speed applications.

Interface circuit $30_1$ can be provided in the form of an integrated circuit (IC) including one or more semiconductor die and can receive power at a VCC connection for coupling to voltage regulators 90 and can have a ground connection GND. Regulators 90 can generate a regulated voltage for powering digital circuitry of the interface circuit.

An oscillator driver 86 is coupled to transmitting coil $24_1$ at pins TXP, TXN and can receive an oscillator reference 88 and may take the form of a resonant circuit (e.g., an LC tank circuit) or other oscillation circuits.

Interface circuit $30_1$ receives signals from receiving coils $28_{1,1}$-$28_{1,m}$ at pins RX1P, RX1N, RX2P, RX2N for coupling to an analog front-end and signal demodulator block 50 as shown. Block 50 processes the received analog signals from receiving coils $28_{1,1}$-$28_{1,m}$ for coupling to respective signal paths, each including an analog-to-digital converter (ADC) 54, 58.

A digital processor 60 can include various sub-blocks, as shown. Example processor blocks can compensate for possible error due to coil/target alignment and perform other functions and can include an amplitude and offset adjustment block 62, an automatic gain control block 66, a synchronization compensation block 68, a harmonic error compensation block 70, a steel target compensation block 72, a quadrature compensation block 74, and a calibration parameter block 76. In general, signal amplitudes will be affected by the current flowing through the transmitting coil and the distance between the coil and the target. Temperature may also affect signal amplitudes and offsets. Thus, amplitude and offset adjustment block 62 can be coupled to receive temperature information from a temperature sensor 92 and can operate to automatically track and compensate signal amplitudes and offsets. Harmonic error compensation block 70 can perform compensation on input signals using correction parameters stored in EEPROM 96 during manufacture in order to thereby remove undesirable harmonics that could adversely affect position sensing.

Interface circuit $30_1$ can include various processing functionality such as an angle and speed calculation block 64 to calculate the speed of high frequency input signals and angle in order to reduce effective latency resulting in fast tracking position sensing. For example, target angle can be computed using a CORDIC method and target speed can be computed as the derivative of target angle. For example, using consecutive angle values in time, speed is proportional to (angle_1−angle_0)/delta_time].

Digital processor 60 can be coupled to an output block 80 with which one or more output signals of the interface circuit $30_1$ are provided. Interface circuit output signals can be provided in one or more of various formats at one or more connections 84 for coupling to external elements and systems (not shown). The selection of interface output signal type can be based on user-programmable parameters stored in EEPROM 96. Example interface circuit outputs 84 include a MISO/MHT/SENT/PWM pin, a MOSI/SENT/PWMA pin, a SCLK/B/INC pin, and a CSN/I pin, as shown. Outputs 84 can support various signal formats including, but not limited to Pulse Width Modulation (PWM) format, Single Edge Nibble Transmission (SENT) format, Local Interconnect Network (LIN) format, CAN (Controller Area Network) format, Serial Peripheral Interface (SPI) format, ABI and/or an Inter-Integrated Circuit ($I^2C$) format to name a few. Interface circuit $30_1$ can further include diagnostics 94 that can interface with EEPROM 96 and temperature sensor 92, as shown.

While the interface circuit $30_1$ may be provided in the illustrated form of an IC with an analog front-end portion and a digital portion, it will be appreciated that the particular delineation of which circuit functions are implemented in an analog fashion or with digital circuitry and signals can be varied. Further, some of the illustrated circuit functions can be implemented on an interface IC and other circuitry and functionality can be implemented on separate circuits (e.g., additional substrates within the same integrated circuit package, or additional integrated circuit packages, and/or on circuit boards).

Figure 2:
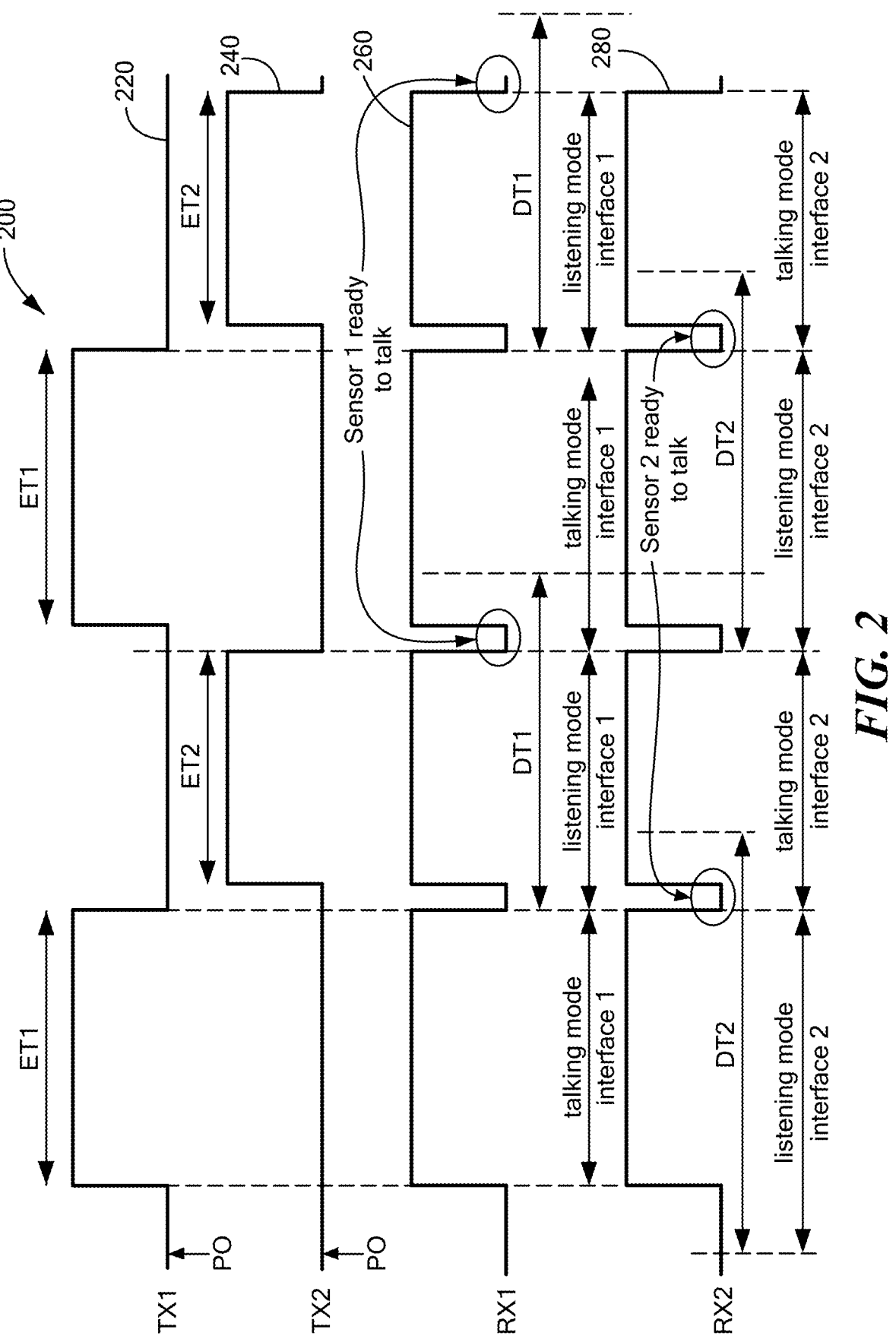
FIG. 2 illustrates example transmitted and received signals in a redundant inductive sensor system, according to the disclosure.

Referring also to FIG. 2, example transmitted and received signals 200 in a redundant inductive sensor system 10 are shown. Example signals 200 are associated with a redundant inductive sensor system of the type shown in FIGS. 1 and 1A having two interface circuits (i.e., n=2) and in which each transmitting coil is associated with a single receiving coil (i.e., m=1). Thus, such a redundant inductive sensor system will be understood to include a first interface circuit $30_1$ associated with a first transmitting coil $24_1$ and a first receiving coil $28_1$ and a second interface circuit $30_2$ associated with a second transmitting coil $24_2$ and a second receiving coil $28_2$.

Example signals 200 include a first transmitted signal TX1 220 transmitted by first interface circuit $30_1$ through first transmitting coil $24_1$ and a second transmitted signal TX2 240 transmitted by second interface circuit $30_2$ through second transmitting coil $24_2$. Also shown in FIG. 2 is a first received signal RX1 260 as received by a first receiving coil 28₁ and a second received signal RX2 280 as received by a second receiving coil 28₂.

First interface circuit 30₁ is adapted to be coupled to first transmitting coil 24₁ to transmit the first transmitted signal TX1 220 during a first transmitting interval ET1 of the first interface circuit 30₁ and is adapted to be coupled to first receiving coil 28₁ (that is electromagnetically coupled to the first transmitting coil) to receive first received signal RX1 260 including data of the first transmitted signal during the first transmitting interval. The first interface circuit 30₁ generates an output signal based on the received data of the first transmitted signal.

Second interface circuit 30₂ is adapted to be coupled to second transmitting coil 24₂ to transmit the second transmitted signal TX2 240 during a second transmitting interval ET2 of the second interface circuit 30₂ that does not overlap with the first transmitting interval ET1 of the first interface circuit 30₁ and is adapted to be coupled to second receiving coil 28₂ (that is electromagnetically coupled to the second transmitting coil) to receive second received signal RX2 280 including data of the second transmitted signal during the second transmitting interval. The second interface circuit 30₂ generates an output signal based on the received data of the second transmitted signal.

According to the disclosed communication methodology, the first interface circuit 30₁ is configured to receive the second transmitted signal 240 during a first listening interval DT1 of the first interface circuit 30₁ encompassing the second transmitting interval ET2 of the second interface circuit 30₂ and the second interface circuit 30₂ is configured to receive the first transmitted signal 220 during a second listening interval DT2 of the second interface circuit 30₂ encompassing the first transmitting interval ET1 of the first interface circuit 30₁. In other words, when an interface circuit is not in a talking or transmitting or emitting mode, it listens to transmissions by the other interface circuit in order to thereby assess the status of the other interface circuit as either operating properly or not, in which case a fault is detected.

With this arrangement, the first interface circuit 30₁ can detect a fault associated with the second interface circuit 30₂ if the second transmitted signal TX2 240 is not received during the first listening interval DT1 of the first interface circuit 30₁. Further, the first interface circuit 30₁ can detect a fault associated with the second interface circuit 30₂ if the second transmitted signal TX2 240 is still being received at the end of the first listening interval DT1 of the first interface circuit 30₁. Similarly, the second interface circuit 30₂ can detect a fault associated with the first interface circuit 30₁ if the first transmitted signal TX1 220 is not received during the second listening interval DT2 of the second interface circuit 30₂. Further, the second interface circuit 30₂ can detect a fault associated with the first interface circuit 30₁ if the first transmitted signal TX1 220 is still being received at the end of the second listening interval DT2 of the second interface circuit 30₂.

In the example waveforms of FIG. 2, no fault is detected since the second transmitted signal 240 is being received during the first listening interval DT1 of the first interface circuit 30₁ and also since the second transmitted signal 240 is no longer being transmitted at the end of the first listening interval DT1 the first interface circuit 30₁, as shown.

The external control unit (not shown) coupled to each of the interface circuits can be configured to control the interface circuits in a manner by which a defective interface circuit can be disabled and the remaining interface circuit can be commanded to operate in a so-called single sensor mode.

More particularly, at power-on (PO), the first interface circuit 30₁ emits transmitted signal TX1 240 without any delay during a predetermined first transmitting interval ET1 of the first interface circuit 30₁ and the second interface circuit 30₂ is in a listening mode for a predetermined listening interval DT2 of the second interface circuit 30₂ that encompasses the first transmitting interval ET1 of the first interface circuit 30₁. During the first transmitting interval ET1 of the first interface circuit 30₁, the first interface circuit 30₁ receives data on receiving coil 28₁ and calculates its output signal on the basis of the received data. Also during the first transmitting interval ET1 of the first interface circuit 30₁, the receiving coil 28₂ associated with the second interface circuit 30₂ receives a signal from the first transmitting coil 24₁ (because listening mode interval DT2 of the second interface circuit 30₂ encompasses the first transmitting interval ET1 of the first interface circuit 30₁). The second transmitting coil 24₂ is not transmitting during this first transmitting interval ET1 of the first interface circuit 30₁. Thus, during the second listening interval DT2 of the second interface circuit 30₂, the second interface circuit 30₂ is listening to transmission by the first transmitting coil.

Following the first transmitting interval ET1 of the first interface circuit 30₁, the first interface circuit 30₁ goes into a listening mode for a predetermined listening interval DT1 of the first interface circuit 30₁. Once the second listening interval DT2 of the second interface circuit 30₂ expires, the second interface circuit 30₂ can emit the second transmitted signal TX2 240 during the predetermined second transmitting interval ET2 of the second interface circuit 30₂. During the second transmitting interval ET2 of the second interface circuit 30₂, the second interface circuit 30₂ receives data on receiving coil 28₂ and calculates its output signal on the basis of the received data.

Also during the second transmitting interval ET2 of the second interface circuit 30₂, the receiving coil 28₁ associated with the first interface circuit 30₁ receives a signal from the second transmitting coil 24₂ (because listening mode interval DT1 of the first interface circuit 30₁ encompasses the second transmitting interval ET2 of the second interface circuit 30₂). The first transmitting coil 24₁ is not transmitting during this second transmitting interval ET2 of the second interface circuit 30₂. Thus, during the first listening interval DT1 of the first interface circuit 30₁, the first interface circuit 30₁ is listening to transmission by the second transmitting coil.

Following the second transmitting interval ET2 of the second interface circuit 30₂, the second interface circuit 30₂ returns to listening mode interval DT2 of the second interface circuit 30₂. Once the first listening interval DT1 of the first interface circuit 30₁ expires, the first interface circuit 30₁ can, again emit the first transmitted signal TX1 220 during the next first transmitting interval ET1 of the first interface circuit 30₁ and operation continues in this manner in subsequent transmission and receiving intervals as shown.

If interface circuit 30₁ failed to emit a signal during listening interval DT2 of the second interface circuit 30₂, then the second interface circuit 30₂ would trigger an error to the controller and would continue to operate, but in a single sensor mode. Further, if the first interface circuit 30₁ failed by continuing to transmit beyond its transmitting interval ET1 (i.e., after the second listening interval DT2 of the second interface circuit 30₂ times out), then the second interface circuit 30₂ would trigger an error to the controller and would continue to operate, but in a single sensor mode. Conversely, if the second interface circuit $30_2$ failed to emit a signal during the first listening interval DT1 of the first interface circuit $30_1$, then the first interface circuit $30_1$ would trigger an error to the controller and would continue to operate, but in a single sensor mode. Further, if the second interface circuit $30_2$ failed by continuing to transmit beyond its transmitting interval ET2 (i.e., after the first listening interval DT1 of the first interface circuit $30_1$ times out), then the first interface circuit $30_1$ would trigger an error to the controller and would continue to operate, but in a single sensor mode.

In some embodiments, interface circuits $30_1$-$30_n$ contain self-diagnostics. If an interface circuit detects an error by operation of a self-diagnostic, the erroneous sensor sends an error flag to the external controller and the controller can command the other interface circuit to operate in a single sensor mode.

Transmitting intervals ET1, ET2 can be predetermined intervals in the sense that their respective durations can be preset and fixed and such transmitting intervals ET1, ET2 can be the same as each other or different. Alternatively, one or both of the transmitting intervals ET1, ET2 can be adjustable, such as by user-programming. Similarly, listening intervals DT1, DT2 can be predetermined intervals in the sense that their respective durations can be preset and fixed and such listening intervals DT1, DT2 can be the same as each other or different. Alternatively, one or both of the listening intervals DT1, DT2 can be adjustable, such as by user-programming.

Figure 3:
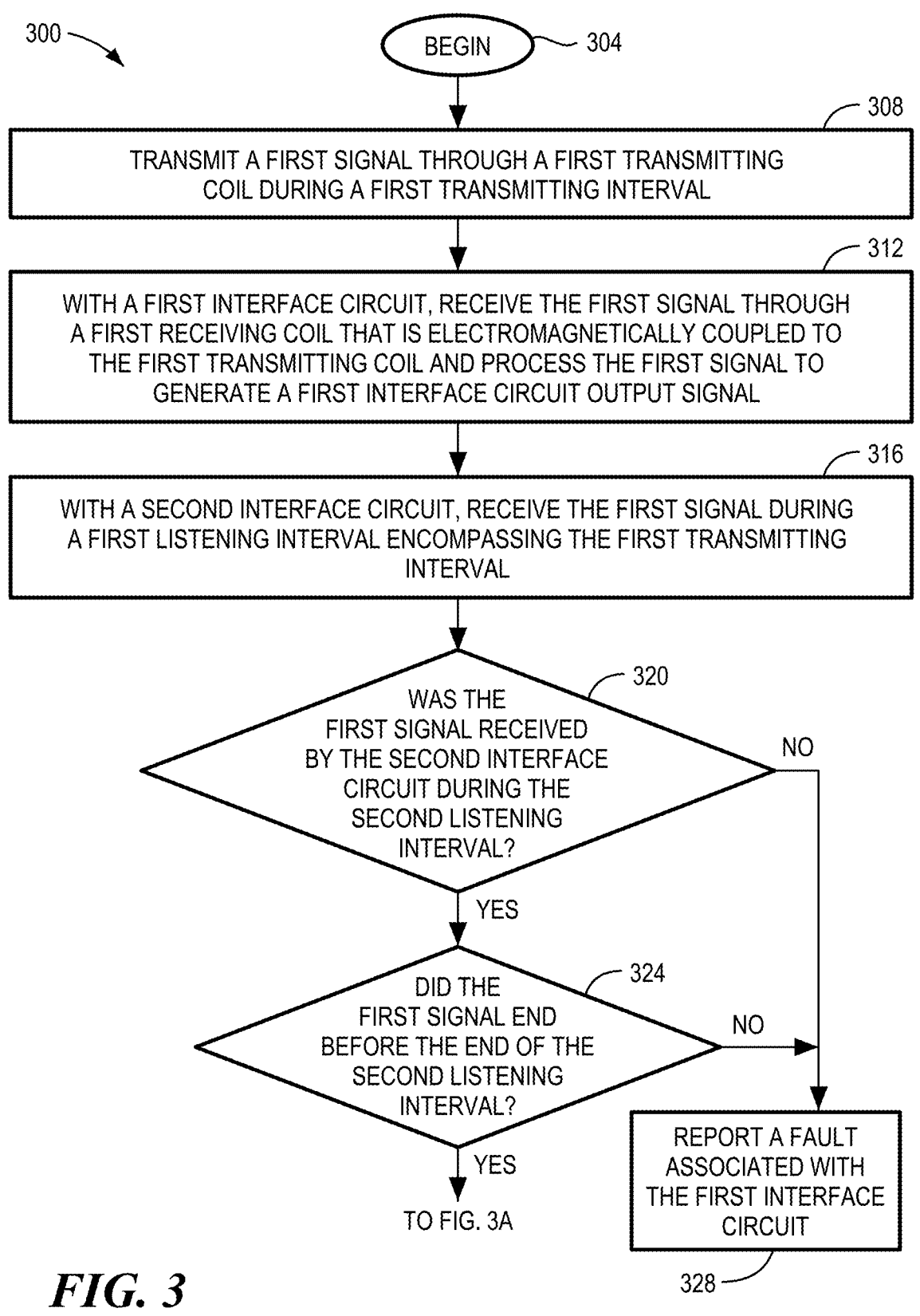

Referring also to FIGS. 3 and 3A, a flow diagram illustrates a method of communication in a redundant sensor system. The method commences at block 304 following which a first signal is transmitted through a first transmitting coil during a first transmitting interval at block 308.

At block 312, with a first interface circuit, the first signal is received through a first receiving coil that is electromagnetically coupled to the first transmitting coil. The first received signal is processed to generate a first interface circuit output signal. In an example, the first interface circuit can be interface circuit $30_1$, the first transmitting coil can be $24_1$, the first receiving coil can be $28_{1,1}$, and the first transmitting interval can be interval ET1 in the example waveforms of FIG. 2.

At block 316, with a second interface circuit, the first signal is received during a second listening interval that encompasses the first transmitting interval. The second interface circuit can be interface circuit $30_2$ and the second listening interval can be interval DT2 in the example waveforms of FIG. 2.

At decision block 320, it can be determined by the second interface circuit whether the first signal was received during the second listening interval. If the first signal was not received by the second interface circuit during the second listening interval, then a fault associated with the first interface circuit can be reported at block 328.

On the other hand, if the first signal was received by the second interface circuit during the second listening interval, then it can be determined at decision block 324 whether the first signal ended before the end of the second listening interval. If the first signal did not end before the end of the second listening interval, then a fault associated with the first interface circuit can be reported at block 328.

On the other hand, if the first signal ends before the end of the second listening interval, then at block 330, a second signal is transmitted through a second transmitting coil during a second transmitting interval.

At block 334, with a second interface circuit, the second signal is received through a second receiving coil that is electromagnetically coupled to the second transmitting coil. The second received signal is processed to generate a second interface circuit output signal. In an example, the second interface circuit can be interface circuit $30_2$, the second transmitting coil can be $24_2$, the second receiving coil can be $28_{2,1}$, and the second transmitting interval can be interval ET2 in the example waveforms of FIG. 2.

At block 338, with the first interface circuit, the second signal is received during a first listening interval that encompasses the second transmitting interval. The first listening interval can be interval DT1 in the example waveforms of FIG. 2.

At block 342, with the first interface circuit, it can be determined if the second signal is received during the first listening interval. If the second signal was not received by the first interface circuit during the first listening interval, then a fault associated with the second interface circuit can be reported at block 350.

On the other hand, if the second signal was received by the first interface circuit during the first listening interval, then it can be determined at decision block 346 whether the second signal ended before the end of the first listening interval. If the second signal did not end before the end of the first listening interval, then a fault associated with the second interface circuit can be reported at block 350. If the second signal ended before the end of the first listening interval, then the process repeats at block 354 (i.e., the process returns to block 308).

Figure 4:
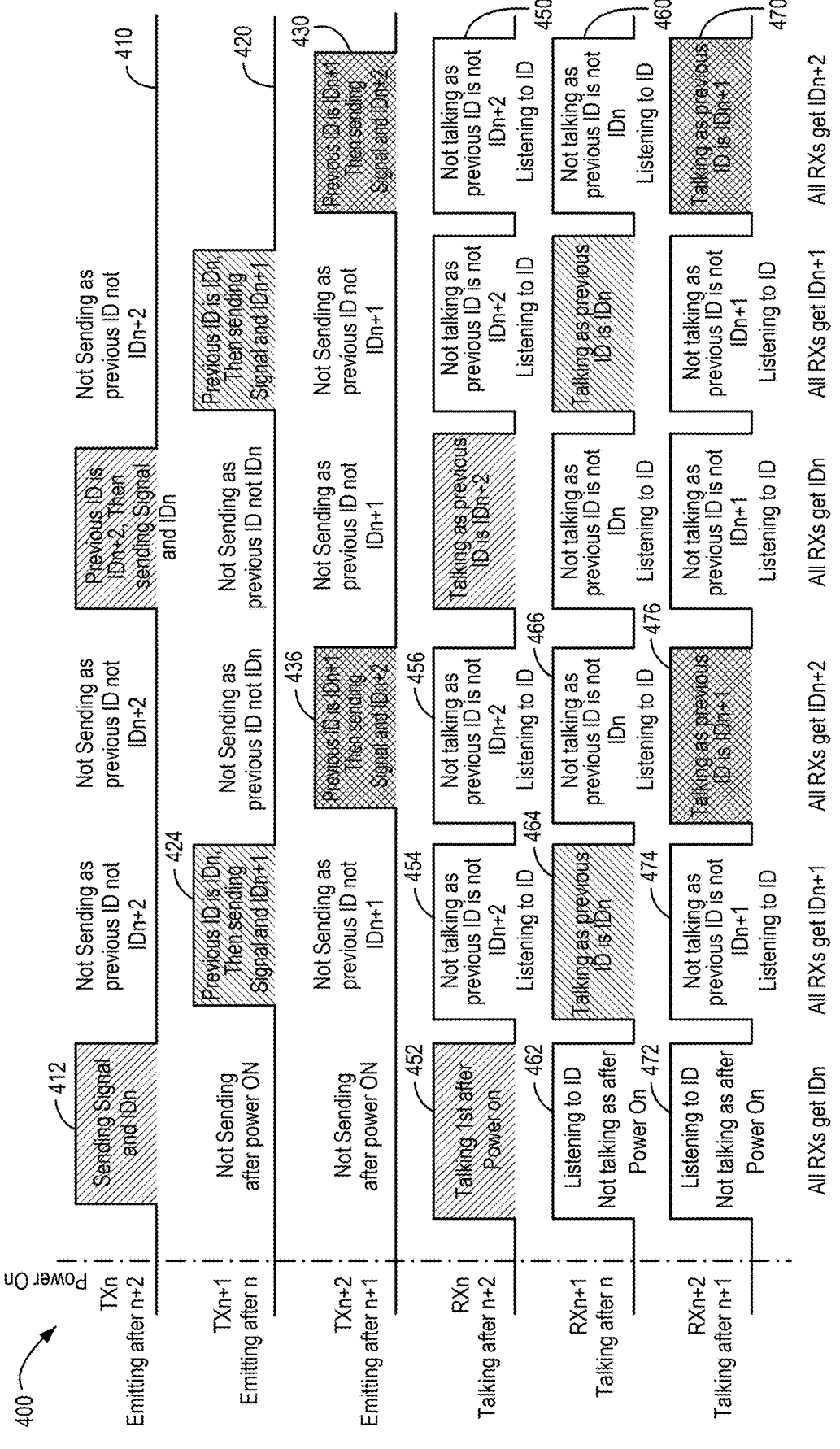
FIG. 4 illustrates example transmitted and received signals in a redundant inductive sensor system having more than two transmitting and receiving coils and associated interface circuits, according to the disclosure.

Referring also to FIG. 4, example waveforms associated with a redundant inductive sensor system that includes more than two interface circuits (i.e., interface circuits n, n+1, and n+2) are shown. For example, in the context of redundant sensor system 10 of FIG. 1, a first interface circuit $30_1$ transmits a signal TXn 410, a second interface circuit $30_2$ transmits a signal TXn+1 420, and a third interface circuit $30_3$ transmits a signal TXn+2 430. Each such interface circuit is configured to receive a signal on an associated receiving coil with interface circuit $30_1$ receiving a signal RXn 450, interface circuit $30_2$ receiving a signal RXn+1 460, and interface circuit $30_3$ receiving a signal RXn+2 470.

In such a system with more than two interface circuits, an identifier (ID) is used to uniquely identify each interface circuit. Various methodologies are possible for encoding the ID, such as transmitting the ID on the transmitted signal using a frequency between the main frequency of the transmitted signal and the maximum bandwidth of the target position to be detected. As an example, if the frequency of the transmitted signal is in the range of 3 to 5 MHz and the target position bandwidth is in the range up to 1 kHz, the ID can be encoded using a 100 kHz and 200 kHz frequency signal in the case of an identifier having two bits (i.e., 100 kHz=0 and 200 kHz=1). It will be appreciated by those of ordinary skill in the art that if two bits are used to encode the ID, then the system can have three interface circuits (since 00 is not a valid ID), if three bits are used to encode the ID, then the system can have seven interface circuits (again since 00 is not a valid ID), etc.

Each interface circuit transmits during a different, non-overlapping transmitting interval with respect to the other interface circuits and transmits its unique ID with each transmission. For example, during a transmitting interval 412, the first interface circuit $30_1$ transmits, during a second transmitting interval 424, the second interface circuit $30_2$ transmits, and during a third transmitting interval 436, the third interface circuit $30_3$ transmits.

When an interface circuit is not transmitting, it listens to transmissions by the other interface circuits and the transmissions uniquely identify which interface circuit is transmitting. Interface circuits are programmed with when to transmit and when to listen. For example, when first interface circuit $30_1$ transmits during transmitting interval 412 and the corresponding receiving coil (e.g., first receiving coil $28_{1,1}$) receives the signal as labeled 452, the other interface circuits (e.g., second interface circuit $30_2$ and third interface circuit $30_3$) listen during listening intervals labeled 462, 472, respectively. In other words, second and third interface circuits $30_2$ and $30_3$ receive the signal transmitted by the first interface circuit $30_1$ on their associated receiving coils. Similarly, when second interface circuit $30_2$ transmits during transmitting interval 424 and the corresponding receiving coil (e.g., second receiving coil $28_{2,1}$) receives the signal as labeled 464, first and third interface circuits $30_1$ and $30_3$ listen. In other words, first and third interface circuits $30_1$ and $30_3$ receive the signal transmitted by the second interface circuit $30_2$ on their associated receiving coils. Transmission and receiving continues in this manner for other interface circuits.

With this arrangement, errors associated with the interface circuits can be detected by the listening interface circuits in the same general manner as described above in connection with FIG. 2. In other words, when interface circuit $30_1$ transmits, listening interface circuits $30_2$ and $30_3$ can detect an error of interface circuit $30_1$ if the transmitted signal is not received during a listening interval and/or if the transmitted signal is still being transmitted at the end of the listening interval.

Figure 5:
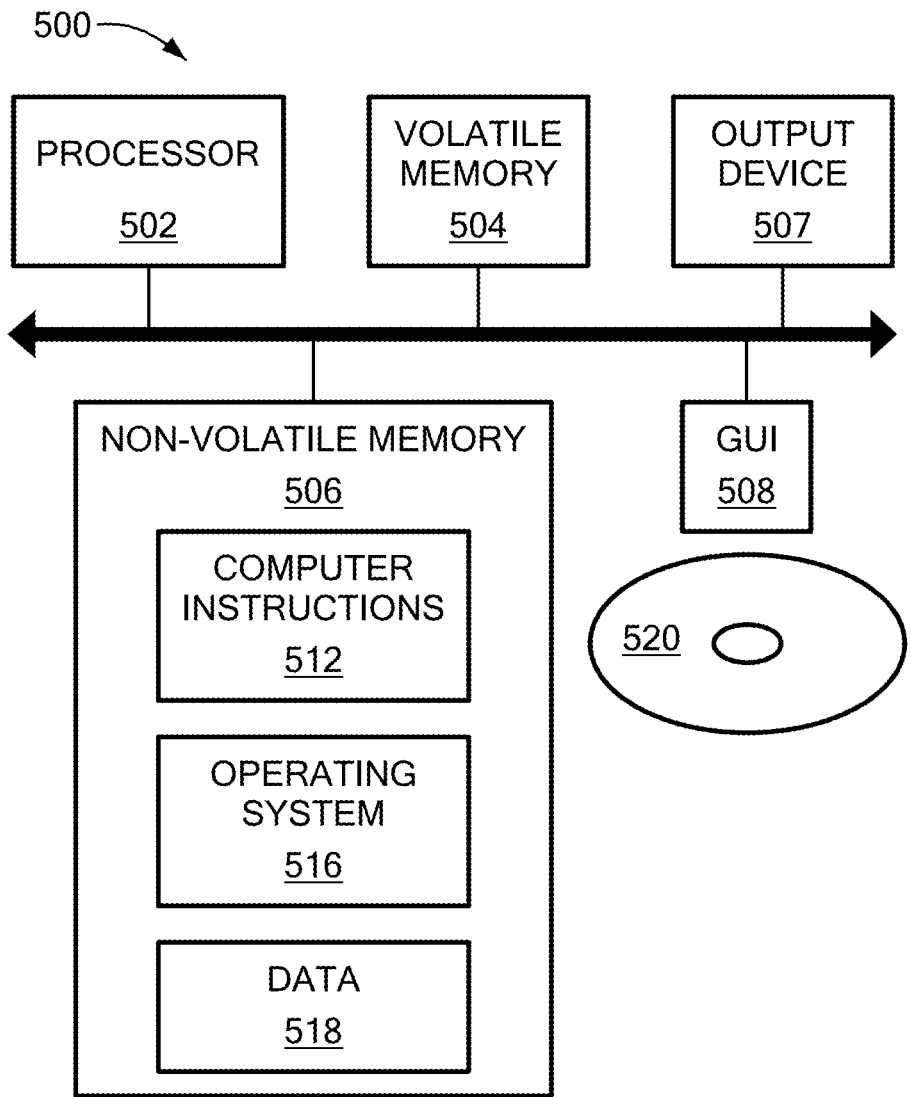
FIG. 5 is a schematic representation of a computer or microcontroller that can perform at least a portion of the processing described herein.

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

As used herein, the term "sensor" is used to describe a circuit that uses one or more sensing elements, generally in combination with other circuits. For example, the sensor can be a magnetic field sensor with one or more magnetic field sensing elements. The magnetic field sensor can be, for example, a rotation detector, a movement detector, or a proximity detector. A linear sensor can sense a magnetic field strength. A rotation detector (or movement detector) can senses passing target objects, for example, magnetic domains of a ring magnet or a ferromagnetic target (e.g., gear teeth) where the magnetic field sensor is used in combination with a back-bias or other magnet and can determine target movement speed. Also, linear arrangements of ferromagnetic objects are possible that move linearly.

As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or an inductive coil. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field pro-grammable gate array (FPGA)). Processing can be imple-mented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Also, the following definitions and abbreviations are to be used for the interpretation of the claims and the specifica-tion. The terms "comprise," "comprises," "comprising," "include," "includes," "including," "has," "having," "con-tains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or charac-teristic. Moreover, such phrases are not necessarily referring to the same embodiment. Further, when a particular feature, structure, or characteristic is described in connection with an embodiment, it may affect such feature, structure, or char-acteristic in other embodiments whether explicitly described or not.

It is noted that various connections and positional rela-tionships (e.g., over, below, adjacent, etc.) may be used to describe elements and components in the description and drawings. These connections and/or positional relationships, unless specified otherwise, can be direct or indirect, and the described concepts, systems, devices, structures, and tech-niques are not intended to be limiting in this respect. Accordingly, a coupling of entities can refer to either a direct or an indirect coupling, and a positional relationship between entities can be a direct or indirect positional rela-tionship. As an example of an indirect positional relation-ship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

In the foregoing detailed description, various features of embodiments are grouped together in one or more individual embodiments for the purpose of streamlining the disclosure. This method of disclosure is not to be interpreted as reflect-ing an intention that the claims require more features than are expressly recited therein. Rather, inventive aspects may lie in less than all features of each disclosed embodiment. Elements of different embodiments described herein may be combined to form other embodiments not specifically set forth above. Various elements, which are described in the context of a single embodiment, may also be provided separately or in any suitable subcombination. Other embodi-ments not specifically described herein are also within the scope of the following claims.

Having described preferred embodiments of the present disclosure, it will now become apparent to one of ordinary skill in the art that other embodiments incorporating their concepts may be used. It is felt therefore that these embodi-ments should not be limited to disclosed embodiments, but rather should be limited only by the spirit and scope of the appended claims.

What is claimed is:

1. An inductive sensor system comprising:
a first interface circuit adapted to be coupled to a first transmitting coil to transmit a first signal through the first transmitting coil during a first transmitting interval of the first interface circuit and adapted to be coupled to a first receiving coil that is electromagnetically coupled to the first transmitting coil and configured to receive the first signal during the first transmitting interval and generate an output signal of the first interface circuit based on the first signal; and
a second interface circuit adapted to be coupled to a second transmitting coil to transmit a second signal through the second transmitting coil during a second transmitting interval of the second interface circuit that does not overlap with the first transmitting interval and adapted to be coupled to a second receiving coil that is electromagnetically coupled to the second transmitting coil and configured to receive the second signal during the second transmitting interval and generate an output signal of the second interface circuit based on the second signal,
wherein the first interface circuit is configured to receive the second signal during a first listening interval of the first interface circuit encompassing the second trans-mitting interval and wherein the second interface cir-cuit is configured to receive the first signal during a second listening interval of the second interface circuit encompassing the first transmitting interval.

2. The inductive sensor system of claim 1 wherein the first interface circuit is configured to detect a fault associated with the second interface circuit if the second signal is not received during the first listening interval.

3. The inductive sensor system of claim 1 wherein the first interface circuit is configured to detect a fault associated with the second interface circuit if the second signal is still being received at the end of the first listening interval.

4. The inductive sensor system of claim 1 further com-prising a substrate supporting the first transmitting coil, the first receiving coil, the second transmitting coil, and the second receiving coil.

5. The inductive sensor system of claim 4 wherein the substrate comprises a printed circuit board.

6. The inductive sensor system of claim 1 wherein the first interface circuit is provided as a first integrated circuit and the second interface circuit is provided as a second integrated circuit.

7. The inductive sensor system of claim 1 further comprising a third interface circuit adapted to be coupled to a third transmitting coil to transmit a third signal through the third transmitting coil during a third transmitting interval of the third interface circuit that does not overlap with the first transmitting interval or with the second transmitting interval and adapted to be coupled to a third receiving coil that is electromagnetically coupled to the third transmitting coil and configured to receive the third signal during the third transmitting interval and generate an output signal of the third interface circuit based on the third signal, wherein, during the first listening interval, both the first interface circuit and the third interface circuit are configured to receive the second signal.

8. The inductive sensor system of claim 7 wherein the first signal includes an identifier of the first interface circuit, the second signal includes an identifier of the second interface circuit, and the third signal includes an identifier of the third interface circuit.

9. The inductive sensor system of claim 8 wherein the identifier of the first interface circuit is encoded in the first signal at an identifier frequency that is less than a frequency of the first signal and greater than a maximum bandwidth associated with a position of a target to be detected by the inductive sensor system, the identifier of the second interface circuit is encoded in the second signal at the identifier frequency, and the identifier of the third interface circuit is encoded in the third signal at the identifier frequency.

10. A method comprising:

transmitting a first signal through a first transmitting coil during a first transmitting interval;

with a first interface circuit, receiving the first signal through a first receiving coil electromagnetically coupled to the first transmitting coil and processing the first signal to generate a first interface circuit output signal;

transmitting a second signal through a second transmitting coil during a second transmitting interval that does not overlap with the first transmitting interval;

with a second interface circuit, receiving the second signal through a second receiving coil electromagnetically coupled to the second transmitting coil and processing the second signal to generate a second interface circuit output signal;

with the first interface circuit, receiving the second signal during a first listening interval of the first interface circuit encompassing the second transmitting interval; and with the second interface circuit, receiving the first signal during a second listening interval of the second interface circuit encompassing the first transmitting interval.

11. The method of claim 10 further comprising detecting, by the first interface circuit, a fault associated with the second interface circuit if the second signal is not received during the first listening interval.

12. The method of claim 10 further comprising detecting, by the first interface circuit, a fault associated with the second interface circuit if the second signal is still being received at the end of the first listening interval.

13. The method of claim 10 further comprising fabricating the first transmitting coil, the first receiving coil, the second transmitting coil, and the second receiving coil on a common substrate.

14. The method of claim 13 wherein the common substrate comprises a printed circuit board.

15. The method of claim 10 further comprising fabricating the first interface circuit as a first integrated circuit and the second interface circuit as a second integrated circuit.

16. The method of claim 10 further comprising:

transmitting a third signal through a third transmitting coil during a third transmitting interval that does not overlap with the first transmitting interval or with the second transmitting interval; and with a third interface circuit adapted to be coupled to a third receiving coil that is electromagnetically coupled to the third transmitting coil, receiving the third signal during the third transmitting interval and processing the third signal to generate a third interface circuit output signal based on the third signal; and during the first listening interval of the first interface circuit, receiving the second signal with both the first interface circuit and the third interface circuit.

17. The method of claim 16 wherein transmitting the first signal comprises transmitting an identifier of the first interface circuit, transmitting the second signal comprises transmitting an identifier of the second interface circuit, and transmitting the third signal comprises transmitting an identifier of the third interface circuit.

18. The method of claim 17 wherein transmitting the identifier of the first circuit comprises encoding the identifier in the first signal at an identifier frequency that is less than a frequency of the first signal and greater than a maximum bandwidth associated with a position of a target to be detected, transmitting the identifier of the second circuit comprises encoding the identifier in the second signal at the identifier frequency, and transmitting the identifier of the third circuit comprises encoding the identifier in the third signal at the identifier frequency.

* * * * *